US012596454B2

(12) United States Patent
Shen

(10) Patent No.: US 12,596,454 B2
(45) Date of Patent: Apr. 7, 2026

(54) MULTI-FREQUENCY ZERO-ROW-SUM CODE-DIVISION-MULTIPLEXING (CDM) TOUCH SENSING

(71) Applicant: Synaptics Incorporated, San Jose, CA (US)

(72) Inventor: Guozhong Shen, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 57 days.

(21) Appl. No.: 18/651,965

(22) Filed: May 1, 2024

(65) Prior Publication Data

US 2025/0341916 A1　　Nov. 6, 2025

(51) Int. Cl.
*G06F 3/041* (2006.01)
*G06F 3/044* (2006.01)

(52) U.S. Cl.
CPC ........ *G06F 3/0418* (2013.01); *G06F 3/04166* (2019.05); *G06F 3/0446* (2019.05)

(58) Field of Classification Search
CPC ... G06F 3/0416–041662; G06F 3/0412; G06F 3/04166; G06F 3/04184; G06F 3/041–04897; G06F 2203/041–04809; H04B 1/71–719; H04J 13/00–0096; H04J 2013/0037–165
See application file for complete search history.

(56) References Cited

U.S. PATENT DOCUMENTS

| | | | |
|---|---|---|---|
| 10,572,067 | B2 | 2/2020 | Schropp, Jr. |
| 11,474,654 | B2 | 10/2022 | Manca |
| 11,531,425 | B1 | 12/2022 | Shen |
| 11,531,439 | B1 | 12/2022 | Shen |
| 2010/0321314 | A1* | 12/2010 | Oda ........................ G06F 3/046 |
| | | | 345/173 |
| 2015/0029131 | A1 | 1/2015 | Cheng et al. |
| 2016/0148034 | A1 | 5/2016 | Kremin et al. |
| 2019/0101999 | A1 | 4/2019 | Amer et al. |
| 2021/0103360 | A1* | 4/2021 | Manca .................. G06F 3/0446 |
| 2025/0077021 | A1* | 3/2025 | Kim .................... G06F 3/04166 |

OTHER PUBLICATIONS

International Search Report dated Jul. 21, 2025 in International Patent Application No. PCT/US2025/024991.

* cited by examiner

*Primary Examiner* — Amr A Awad
*Assistant Examiner* — Aaron Midkiff
(74) *Attorney, Agent, or Firm* — Leydig, Voit & Mayer, Ltd.

(57) ABSTRACT

An input device includes a plurality of sensor electrodes and a processing system. The plurality of sensor electrodes includes transmitter electrodes and receiver electrodes. The processing system configured to: drive the transmitter electrodes using multiple frequencies and multiple zero-row-sum code-division-multiplexing (CDM) drive matrices, wherein respective subsets of the transmitter electrodes are driven with sensing signals at respective frequencies of the multiple frequencies, and wherein each of the zero-row-sum CDM drive matrices corresponds to a respective frequency of the multiple frequencies; obtain resulting signals via the receiver electrodes based on the transmitter electrodes being driven with the zero-row-sum CDM drive matrix; decode the resulting signals, wherein decoding the resulting signals includes performing a signal level recovery process; and determine presence, location and/or motion of one or more input objects based on the decoded resulting signals.

20 Claims, 5 Drawing Sheets

400a

| Drive transmitter electrodes of sensor array with multi-frequency zero-row-sum CDM transmitter signals | 302 |

↓

| Obtain resulting signals, via receiver electrodes, corresponding to the transmitter signals | 304 |

↓

| Decode resulting signals | 306 |

↓

| Determine presence, location and/or motion of one or more input objects | 308 |

300

400a

400b

MULTI-FREQUENCY ZERO-ROW-SUM CODE-DIVISION-MULTIPLEXING (CDM) TOUCH SENSING

TECHNICAL FIELD

The described embodiments relate generally to electronic devices, and more specifically, to touch sensors.

BACKGROUND

Input devices including touch sensor devices (e.g., touchpads or touch sensor devices) are widely used in a variety of electronic systems. A touch sensor device typically includes a sensing region, often demarked by a surface, in which the touch sensor device determines the presence, location and/or motion of one or more input objects. Touch sensor devices may be used to provide interfaces for the electronic system. For example, touch sensor devices are often used as input devices for larger computing systems (such as opaque touchpads integrated in, or peripheral to, notebook or desktop computers). Touch sensor devices are also often used in smaller computing systems (such as touch screens integrated in cellular phones and tablet computers). Such touch screen input devices are typically superimposed upon or otherwise collocated with a display screen of the electronic system.

SUMMARY

In an exemplary embodiment, the present application provides an input device. The input device includes: a plurality of sensor electrodes, including transmitter electrodes and receiver electrodes; and a processing system configured to: drive the transmitter electrodes using multiple frequencies and multiple zero-row-sum code-division-multiplexing (CDM) drive matrices, wherein respective subsets of the transmitter electrodes are driven with sensing signals at respective frequencies of the multiple frequencies, and wherein each of the zero-row-sum CDM drive matrices corresponds to a respective frequency of the multiple frequencies; obtain resulting signals via the receiver electrodes based on the transmitter electrodes being driven with the zero-row-sum CDM drive matrix; decode the resulting signals, wherein decoding the resulting signals includes performing a signal level recovery process; and determine presence, location and/or motion of one or more input objects based on the decoded resulting signals.

In a further exemplary embodiment, the multiple frequencies include a first frequency corresponding to a first subset of transmitter electrodes and a second frequency corresponding to a second subset of transmitted electrodes, the first subset of transmitter electrodes does not overlap with the second subset of transmitted electrodes, and the first and second subsets of transmitted electrodes are driven simultaneously.

In a further exemplary embodiment, the multiple frequencies include a first frequency corresponding to a first subset of transmitter electrodes and a second frequency corresponding to a second subset of transmitted electrodes, the first subset of transmitter electrodes overlaps with the second subset of transmitted electrodes, and the first and second subsets of transmitted electrodes are driven sequentially.

In a further exemplary embodiment, each zero-row-sum CDM drive matrix has a/b rows, where a is the number of electrodes of the transmitter electrodes, and b is the number of frequencies of the multiple frequencies.

In a further exemplary embodiment, performing the signal level recovery process includes: for each respective receiver electrode, adding a signal level recovery value to each of a plurality of readings corresponding to the respective receiver electrode.

In a further exemplary embodiment, the signal level recovery value corresponds to a value less than a median value of a set of readings corresponding to the respective receiver electrode.

In a further exemplary embodiment, the signal level recovery value for a respective receiver electrode is set to an $x^{th}$ smallest reading from among n readings for the respective receiver electrodes, where n corresponds to the number of rows of a respective zero-row-sum CDM driving matrix, and x is an integer less than n/2.

In a further exemplary embodiment, x is less than 90% of n/2 and not less than 70% of n/2.

In a further exemplary embodiment, decoding the resulting signals further includes: performing a CDM decoding process; and performing a display noise removal process.

In a further exemplary embodiment, the CDM decoding process is performed before the display noise removal process, and both the CDM decoding process and the display noise removal process are performed prior to the signal level recovery process.

In a further exemplary embodiment, the display noise removal process is performed before the CDM decoding process, and both the CDM decoding process and the display noise removal process are performed prior to the signal level recovery process.

In another exemplary embodiment, the present application provides an input device. The input device includes: a plurality of sensor electrodes, including transmitter electrodes and receiver electrodes; and a processing system configured to: drive the transmitter electrodes using multiple frequencies and multiple zero-row-sum code-division-multiplexing (CDM) drive matrices, wherein respective subsets of the transmitter electrodes are driven with sensing signals at respective frequencies of the multiple frequencies, and wherein each of the zero-row-sum CDM drive matrices corresponds to a respective frequency of the multiple frequencies; obtain resulting signals via the receiver electrodes based on the transmitter electrodes being driven with the zero-row-sum CDM drive matrix; decode the resulting signals; and determine presence, location and/or motion of one or more input objects based on the decoded resulting signals.

In a further exemplary embodiment, the multiple frequencies include a first frequency corresponding to a first subset of transmitter electrodes and a second frequency corresponding to a second subset of transmitted electrodes, the first subset of transmitter electrodes does not overlap with the second subset of transmitted electrodes, and the first and second subsets of transmitted electrodes are driven simultaneously.

In a further exemplary embodiment, the multiple frequencies include a first frequency corresponding to a first subset of transmitter electrodes and a second frequency corresponding to a second subset of transmitted electrodes, the first subset of transmitter electrodes overlaps with the second subset of transmitted electrodes, and the first and second subsets of transmitted electrodes are driven sequentially.

In a further exemplary embodiment, each zero-row-sum CDM drive matrix has a/b rows, where a is the number of electrodes of the transmitter electrodes, and b is the number of frequencies of the multiple frequencies.

In yet another exemplary embodiment, the present application provides an input device. The input device includes:

a plurality of sensor electrodes, including transmitter electrodes and receiver electrodes; and a processing system configured to: drive the transmitter electrodes using a code-division-multiplexing (CDM) drive matrix; obtain resulting signals via the receiver electrodes based on the transmitter electrodes being driven with the zero-row-sum CDM drive matrix; decode the resulting signals, wherein decoding the resulting signals includes performing a signal level recovery process; and determine presence, location and/or motion of one or more input objects based on the decoded resulting signals.

In a further exemplary embodiment, performing the signal level recovery process comprises: for each respective receiver electrode, adding a signal level recovery value to each of a plurality of readings corresponding to the respective receiver electrode.

In a further exemplary embodiment, the signal level recovery value corresponds to a value less than a median value of a set of readings corresponding to the respective receiver electrode.

In a further exemplary embodiment, the signal level recovery value for a respective receiver electrode is set to an $x^{th}$ smallest reading from among n readings for the respective receiver electrodes, where n corresponds to the number of rows of a respective zero-row-sum CDM driving matrix, and x is an integer less than n/2.

In a further exemplary embodiment, x is less than 90% of n/2 and not less than 70% of n/2.

DETAILED DESCRIPTION

Figure 1:
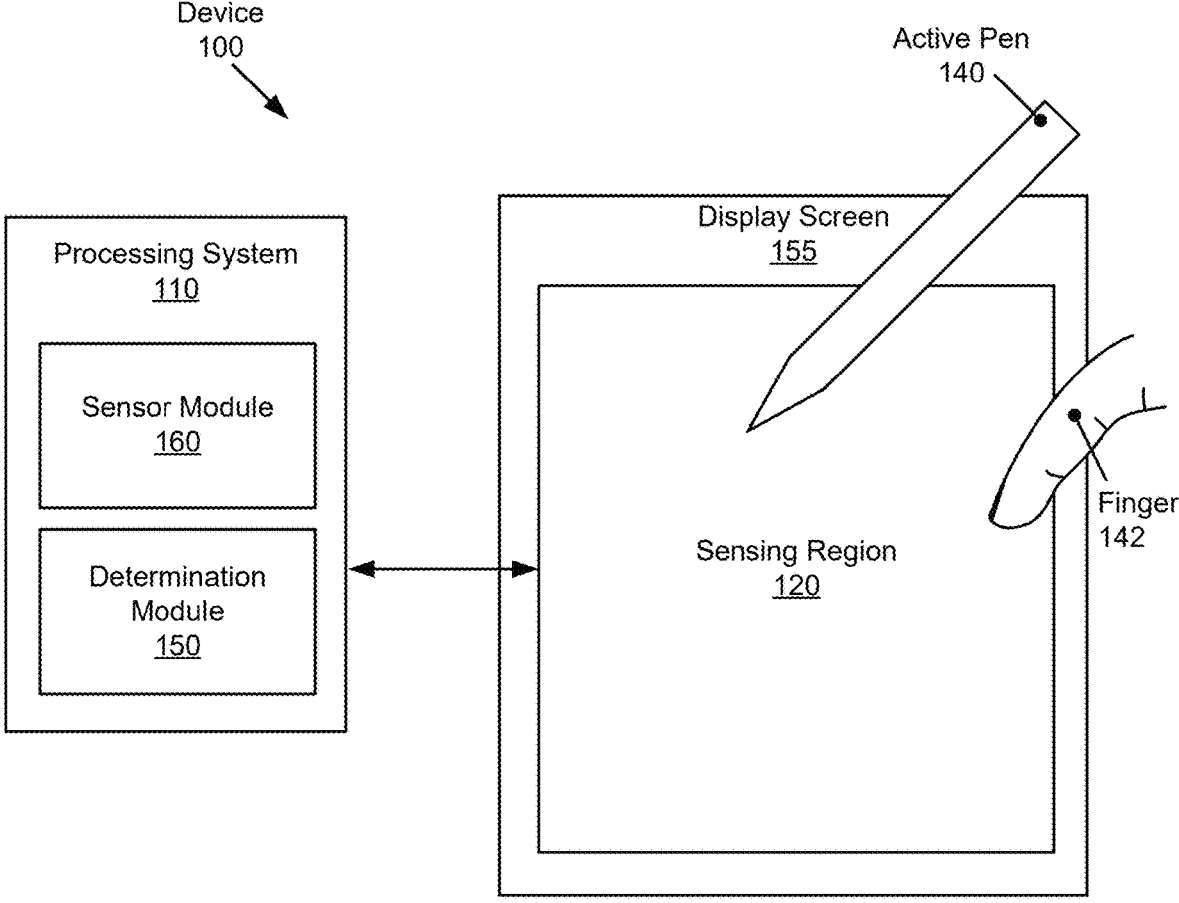
FIG. 1 depicts a block diagram of an example input device.

The following detailed description is exemplary in nature and is not intended to limit the invention or the application and uses of the invention. Furthermore, there is no intention to be bound by any expressed or implied theory presented in the preceding technical field, background, brief summary, brief description of drawings, or the following detailed description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Touch-to-display (T2D) interference arises when touch sensing signals result in interference with display signals of a display panel proximate to a touch sensor (such as resulting in the appearance of display artifacts). As touchscreen display devices, such as modern smartphones, get thinner and thinner, the distance between the touch sensing circuitry and the display circuitry gets smaller and smaller, making such devices more and more susceptible to T2D interference issues. T2D interference is particularly an issue for organic light-emitting diode (OLED) touchscreen devices, which may have a distance between a touch sensor and a display being as small as 5 μm.

Embodiments of the present application provide a way to minimize T2D by utilizing a multi-frequency zero-row-sum code-division-multiplexing (CDM) manner of touch sensing whereby multiple CDM driving matrices are utilized, each CDM driving matrix corresponding to a respective frequency and having zero-row-sum in each driving step. By performing touch sensing in the multi-frequency zero-row-sum CDM manner, the touch driving signals cancel each other out from the perspective of the display circuitry, such that the display circuitry is not affected by the touch sensing signals. Additionally, the utilization of multiple frequencies for different subsets of sensor electrodes allows for smaller CDM matrices to be used, enabling the touch sensing to be completed more quickly (less sensing steps ("bursts") needed) and enabling more efficient decoding (smaller matrices to be processed) relative to conventional manners of performing touch sensing.

Embodiments of the present application further provide a way to "recover" a signal level of the measurements received on receiver electrodes on the decoding side. That is, due to the usage of the zero-row-sum CDM for the transmitter electrodes, the overall signal level of the sensing signals driven onto the transmitter electrodes (as well as the corresponding touch-to-display interference) is zero or close to zero, and the mean of the decoding result on each receiver electrode over all driving steps is also zero. As a result, issues may arise where small input objects (such as a small finger) might not be detected (false negative), or where low ground mass (LGM) conditions cause image artifacts in the detected 2D image (e.g., LGM conditions may exist when a capacitive input device does not have a good connection to ground and may result in a "negative" of one or more input objects being part of the capacitive image). By performing signal level recovery in accordance with example embodiments of the present application to recover a signal level of the measurements obtained via the receiver electrodes (as if detection had been performed without zero-row-sums), such issues may be avoided or mitigated. Thus, advantages of utilizing zero-row-sum CDM on the transmitter side (e.g., low touch-to-display noise) may be realized while also avoiding drawbacks associated with using zero-row-sum CDM on the receiver side (e.g., with respect to potential false negatives or image artifacts).

FIG. 1 is a block diagram of an exemplary input device 100 for which exemplary embodiments of the present disclosure are applicable. The input device 100 may be configured to provide input to an electronic system. As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

In FIG. 1, the input device 100 is shown as a touch sensor device (e.g., "touchpad" or a "touch sensor device") configured to sense input provided by one or more input objects in a sensing region 120. Example input objects include styli, an active pen 140, and fingers 142. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region 120 encompasses any space above, around, in and/or near the input device 100 in which the input device 100 is able to detect user input (e.g., user input provided by one or more input objects). The sizes, shapes, and locations of particular sensing regions may vary widely from embodiment to embodiment.

The input device 100 may use any combination of sensor components and sensing technologies to detect user input in the sensing region 120. The input device 100 includes one or more sensing elements for detecting user input. The sensing elements may be capacitive.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground.

In some embodiments, transmitter sensor electrodes and receiver sensor electrodes may both be modulated. The transmitter electrodes may be modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect (s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

In FIG. 1, a processing system 110 is shown as part of the input device 100. The processing system 110 is configured to operate the hardware of the input device 100 to detect input in the sensing region 120. The processing system 110 includes parts of or all of one or more integrated circuits (ICs) and/or other circuitry components. For example, a processing system 110 for a mutual capacitance sensor device may include transmitter circuitry configured to transmit signals with transmitter sensor electrodes, and/or receiver circuitry configured to receive signals with receiver sensor electrodes. Further, a processing system 110 for an absolute capacitance sensor device may include driver circuitry configured to drive absolute capacitance signals onto sensor electrodes, and/or receiver circuitry configured to receive signals with those sensor electrodes. In one or more embodiments, a processing system 110 for a combined mutual and absolute capacitance sensor device may include any combination of the above described mutual and absolute capacitance circuitry. A processing system 110 may further include receiver circuitry configured to receive signals emitted by a different source, e.g., an active pen 140. The signals by the active pen 140 may be received by the receiver sensor electrodes, while transmit signals are not necessarily emitted by transmitter sensor electrodes.

In some embodiments, the processing system 110 also includes electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to the sensing element(s) of the input device 100, and one or more components elsewhere.

For example, the input device 100 may be a peripheral coupled to a computing device, and the processing system 110 may include software configured to run on a central processing unit of the computing device and one or more ICs (perhaps with associated firmware) separate from the central processing unit. As another example, the input device 100 may be physically integrated in a mobile device, and the processing system 110 may include circuits and firmware that are part of a main processor of the mobile device. In some embodiments, the processing system 110 is dedicated to implementing the input device 100. In other embodiments, the processing system 110 also performs other functions, such as operating display screens 155, driving haptic actuators, etc.

The processing system 110 may be implemented as a set of modules that handle different functions of the processing system 110. Each module may include circuitry, firmware, software, or a combination thereof. In various embodiments, different combinations of modules may be used. For example, as shown in FIG. 1, the processing system 110 may include a determination module 150 and a sensor module 160. The determination module 150 may include functionality to determine when at least one input object is in a sensing region, signal to noise ratio, positional information of an input object, a gesture, an action to perform based on the gesture, a combination of gestures or other information, and/or other operations. For example, the determination module 150 may be implemented in the form of a controller and/or processing circuitry.

The sensor module 160 may include functionality to drive the sensing elements to transmit transmitter signals and receive the resulting signals. For example, the sensor module 160 may include sensory circuitry that is coupled to the sensing elements. The sensor module 160 may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The receiver module of the sensor module 160 may receive resulting signals from sensor electrodes in the electrode pattern using a capacitive sensing signal having a sensing frequency, e.g., generated by the transmitter module. The resulting signals may include desired signals, such as active pen data or signal components caused by an input object being in proximity to the electrode pattern, or undesired signals, such as noise or interference. As will be described in greater detail below, the sensor module 160 may perform one or more demodulation operations on the resulting signal.

Although FIG. 1 shows a determination module 150 and a sensor module 160, alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens 155, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

In some embodiments, the input device 100 includes a touch screen interface, and the sensing region 120 overlaps at least part of an active area of a display screen 155. For example, the input device 100 may include substantially transparent sensor electrodes overlaying the display screen and provide a touch screen interface for the associated electronic system. The display screen may be any type of dynamic display capable of displaying a visual interface to a user and may include any type of light emitting diode (LED), organic LED (OLED), cathode ray tube (CRT), liquid crystal display (LCD), plasma, electroluminescence (EL), or other display technology. The input device 100 and the display screen 155 may share physical elements. For example, some embodiments may utilize some of the same electrical components for displaying and sensing. In various embodiments, one or more display electrodes of a display device may be configured for both display updating and input sensing. As another example, the display screen 155 may be operated in part or in total by the processing system 110.

FIG. 1 shows merely one exemplary configuration of components, and it will be appreciated that other configurations may be used without departing from the scope of the disclosure. For example, various components may be combined to create a single component. As another example, the functionality performed by a single component may be performed by two or more components. Further, while a configuration for touch sensing is described, other parameters such as force may be sensed.

Figure 2A:
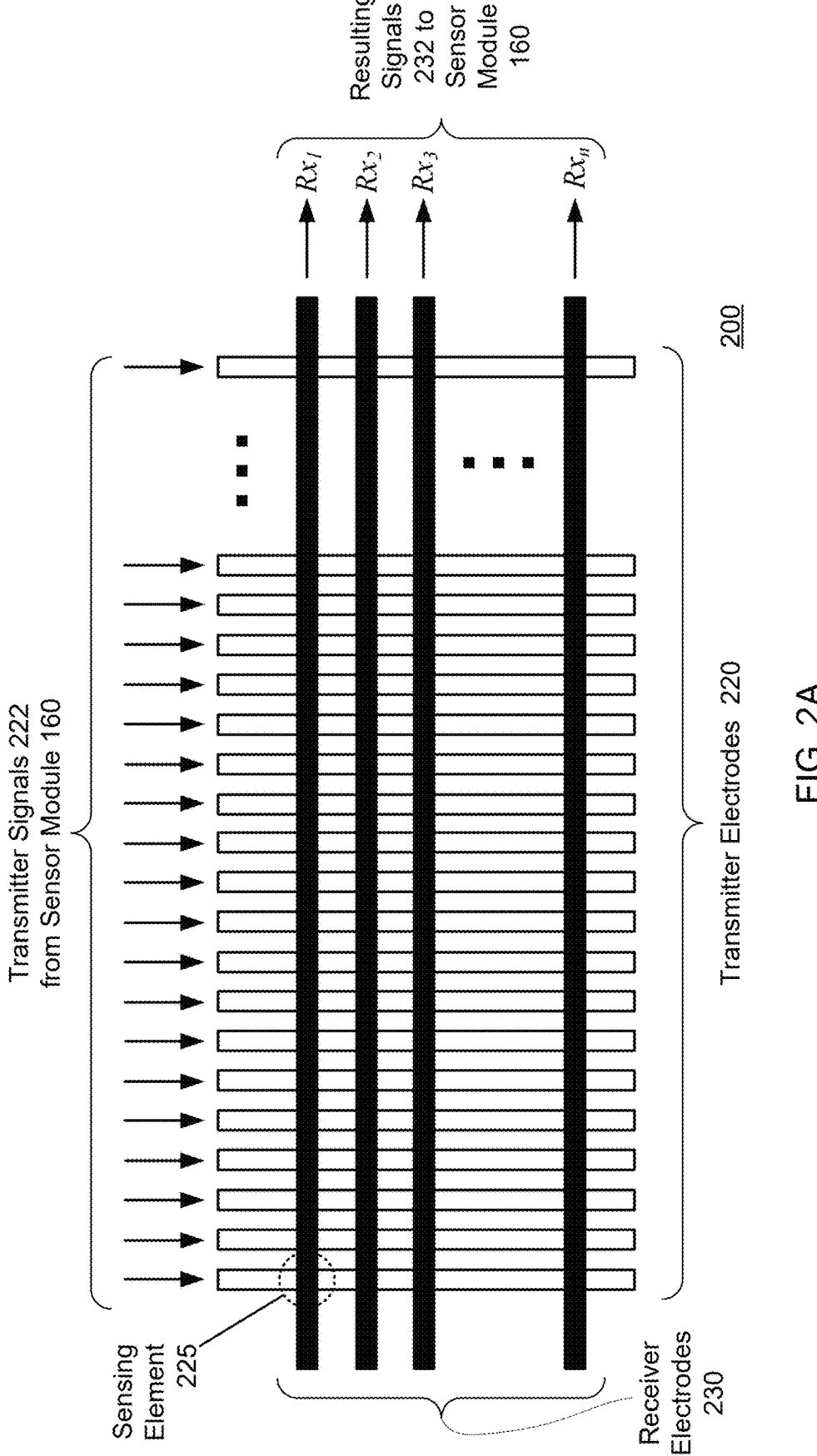
FIG. 2A depicts an example sensor array.

FIG. 2A shows an exemplary sensor array 200. The sensor array 200 is based on an arrangement of sensor electrodes in a sensing region (e.g., sensing region 120 as shown in FIG. 1). Transmitter (Tx) electrodes 220 and receiver (Rx) electrodes 230 may be disposed in the sensing region. In the example of FIG. 2, the Tx electrodes 220 are elongated rectangular structures arranged in columns, whereas the Rx electrodes 230 are elongated rectangular structures arranged in rows. Generally, it will be appreciated that Tx and Rx electrodes of any shape may be used, and exemplary embodiments of the present disclosure are not limited to the bars-and-stripes configuration shown in FIG. 2A.

In one or more embodiments, the Tx electrodes 220 and the Rx electrodes 230, together, implement mutual capacitance or transcapacitance sensing. At the intersection of a Tx electrode 220 and an Rx electrode 230, a localized capacitive coupling is formed between a portion of a respective Tx electrode 220 and a portion of a respective Rx electrode 230. The region of this localized capacitive coupling may be termed a "capacitive pixel," or also referred to herein as a sensing element 225. A transcapacitance Ct is associated with the sensing element 225. When an input object approaches the sensing element 225, the transcapacitance Ct may change by an amount ΔCt. A presence or absence of the input object may thus be detected by monitoring ΔCt. ΔCt may be measured by driving a transmitter signal 222 onto the Tx electrode 220 and receiving a resulting signal 232 from the Rx electrode 230. The resulting signal is a function of the transmitter signal and ΔCt due to the presence or absence of an input object. ΔCt measurements may be obtained for multiple sensing elements to generate a capacitive image, e.g., spanning the entire sensing region 120.

It will be appreciated that in the case of performing conventional touch sensing without CDM and using only a single frequency for the transmitter signals, each transmitter electrode 220 may be operated on its own in a respective burst, meaning that the number of sensing bursts needed to complete touch sensing for the sensing region of the sensor array (i.e., to obtain a 2D capacitive image of the entire sensing region) would be equal to the number of transmitter electrodes 220. Similarly, in the case of performing zero-row-sum CDM touch sensing using only a single frequency, the number of bursts needed to complete touch sensing for the sensing region of the sensor array would also be equal to the number of transmitter electrodes 220, and the zero-row-sum CDM driving matrix would have a number of rows equal to the number of sensing bursts, wherein the sum of values across each row would be equal to zero (due to the use of transmitter signals having opposite polarities within each row), and wherein each row includes a different combination of positive and negative polarity elements (e.g., respectively corresponding to 0 and 180 degree phases).

In an example for a sensor array having 144 transmitter electrodes, the zero-row-sum CDM driving matrix may be 144×144, the first row of the matrix may be all 0s, and the following $2^{nd}$ through $144^{th}$ rows of the matrix may be completely filled with either 1s or −1s (corresponding to positive and negative polarities being driven onto respective transmitter electrodes corresponding to the respective columns of the matrix), whereby in practice, 143 driving steps would be performed corresponding to the $2^{nd}$ through $144^{th}$ rows. In another example, the zero-row-sum CDM driving matrix may be entirely comprised of 1s or −1s, such that every entry of the matrix is either a 1 or a −1, and each row of the matrix has a different combination of 1s and −1s. In other example implementations, a mixture of 1s, 0s, and −1s may be used in one or more rows (with the row sums still equaling 0). In still further example implementations, there may also be amplitude levels other than 1 or −1 used, such as the use of fractional values or values with magnitude greater than 1 (with the row sums still equaling 0).

Utilizing multiple-frequency zero-row-sum CDM touch sensing allows for a reduction in the size of the CDM driving matrices used for touch sensing. For example, for a sensor array having 144 transmitter electrodes, if two frequencies are used, then the transmitter signals driven onto the transmitter electrodes 220 can be configured according to two 72×72 zero-row-sum CDM driving matrices (which may or may not be the same). To provide another example, for a sensor array having 144 transmitter electrodes, if three frequencies are used, then the transmitter signals driven onto the transmitter electrodes 220 may be configured according to three 48×48 zero-row-sum CDM driving matrices (which, again, may or may not be the same). And because the transmitter signals of different frequencies can be driven onto the transmitter electrodes 220 simultaneously, the use of multiple frequencies allows for a significant reduction in the sensing time needed to obtain a 2D capacitive image of the sensing region (e.g., in the case of 2 frequencies, 72 bursts are performed, and in the case of 3 frequencies, 48 bursts are performed, whereas in the case of using only 1 frequency, as discussed above, 144 bursts are performed). In general terms, for a sensor array having a transmitter electrodes, the number of rows of the multi-frequency CDM matrices used for driving the transmitter electrodes may be a/b, where b is the number of frequencies.

Figure 2B:
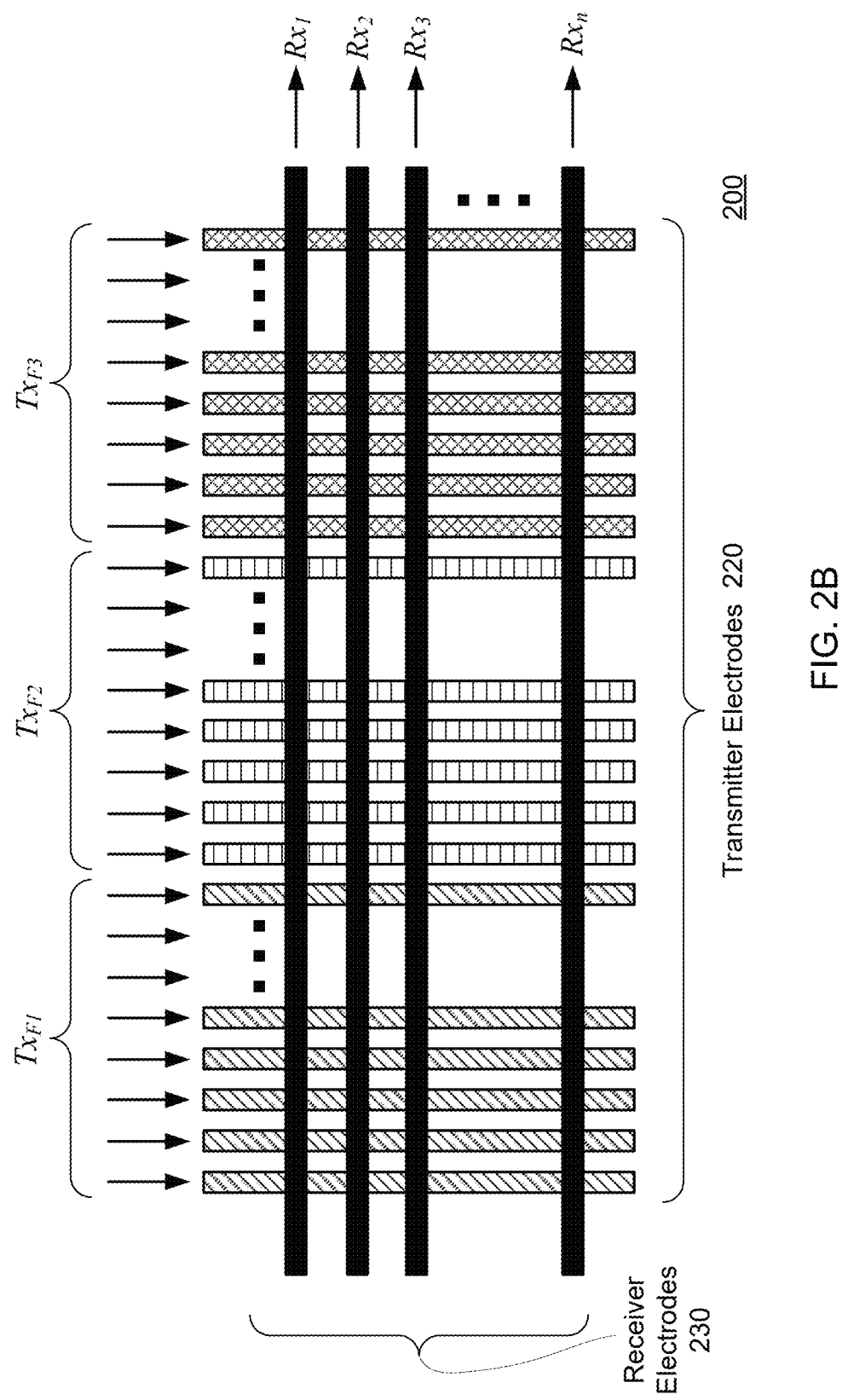
FIG. 2B depicts an example sensor array being driven with transmitter signals in a multi-frequency zero-row-sum code-division-multiplexing (CDM) manner for touch sensing.

FIG. 2B depicts the example sensor array 200 of FIG. 2A being driven with transmitter signals in a multi-frequency zero-row-sum code-division-multiplexing (CDM) manner for touch sensing. In this example, three different frequencies, corresponding to three respective CDM drive matrices, are used. In particular, a first set of transmitter electrodes $TX_{F1}$ are driven with transmitter signals at a first frequency F1, a second set of transmitter electrodes $TX_{F2}$ are driven with transmitter signals at a second frequency F2, and a third set of transmitter electrodes $TX_{F3}$ are driven with transmitter signals at a third frequency F3. The transmitter signals of the three different frequencies are driven onto the transmitter electrodes simultaneously, the receiver electrodes 230 obtain resulting signals corresponding to the three frequencies, and the receiver circuitry of a processing system 110 connected to the receiver electrodes 230 is configured to decode the resulting signals corresponding to the three frequencies.

Accordingly, as discussed above, the respective CDM driving matrices for each respective set of transmitter electrodes may be a fraction (e.g., ⅓ for three frequencies used) of the size of a CDM driving matrix used in the case of single-frequency zero-row-sum CDM touch sensing, and significant advantages with respect to time savings and computational complexity are achieved.

It will be appreciated that although the example shown in FIG. 2B has each set of transmitter electrodes of a respective frequency grouped together in a contiguous portion of the sensing region, in other example embodiments, the sets of transmitter electrodes may be non-contiguous. For example, the transmitter electrodes driven at different frequencies may be interleaved with another, such that the transmitter electrodes follow the pattern of a $TX_{F1}$ transmitter electrode being followed by a $TX_{F2}$ transmitter electrode, which is then followed by a $TX_{F3}$ transmitter electrode in a repeating pattern of $TX_{F1}$, $TX_{F2}$, $TX_{F3}$. In this case, the CDM matrix for each frequency is still applied to the electrodes of that frequency, such that a first CDM matrix for frequency F1 would apply to every third electrode starting from the first electrode, a second CDM matrix for frequency F2 would apply to every third electrode starting from the second electrode, etc.

It will be appreciated that, although the example embodiments discussed above perform touch sensing simultaneously on all transmitter electrodes using different frequencies, in certain alternative example embodiments, the transmitter signals may be driven onto different groups of transmitter electrodes sequentially, or a combination of sequential and simultaneous driving may be performed. For example, in the case of four frequencies being used for four respective subsets of transmitter electrodes, in one example implementation, a combination of sequential and simultaneous driving may be performed, whereby two subsets of transmitter electrodes respectively corresponding to first and second frequencies are driven simultaneously in a first time period, followed by another two subsets of transmitter electrodes respectively corresponding to third and fourth frequencies being driven simultaneously in a second time period after the first time period. In another example implementation involving four frequencies, the first, second, third and fourth subsets of transmitter electrodes may be driven sequentially in four different time periods, wherein one respective subset is driven in each respective time period.

It will be appreciated that in the case of all transmitter electrodes 220 being driven simultaneously at multiple frequencies, the respective subsets of transmitter electrodes driven at different frequencies do not overlap with another (e.g., none of the electrodes in the first subset of transmitter electrodes $TX_{F1}$ are part of the second subset $TX_{F2}$ or the third subset $TX_{F3}$). However, in the case of one or more subsets of transmitter electrodes being driven sequentially relative to one or more other subsets, there may or may not be overlap between the subsets of electrodes in various different embodiments. In the case of there being overlap, for example, a transmitter electrode that is part of a first subset driven at a first frequency during a first time period may also be part of a second subset driven at a second frequency during a second time period after the first period.

It will further be appreciated that although the above-discussed examples include two frequencies, three frequencies, or four frequencies being used for respective subsets of transmitter electrodes in accordance with multiple-frequency zero-row-sum CDM touch sensing, other example embodiments may utilize even more frequencies, depending on the configuration of the processing system. In many cases, the use of two or three frequencies would be sufficient to complete touch sensing within an amount of time specified by design requirements for various applications, but if even faster sensing times were to be needed, the number of frequencies produced by the transmitter circuitry of the processing system may be increased as appropriate for a respective application. The multiple frequencies may be orthogonal relative to one another to avoid intraband interference (IBI). In general, the multiple frequencies are selected to be close to each other to minimize the overall combined bandwidth while still avoiding IBI. Thus, gaps between adjacent frequencies may be controlled to be slightly larger than a half-bandwidth with respect to each frequency.

Figure 3:
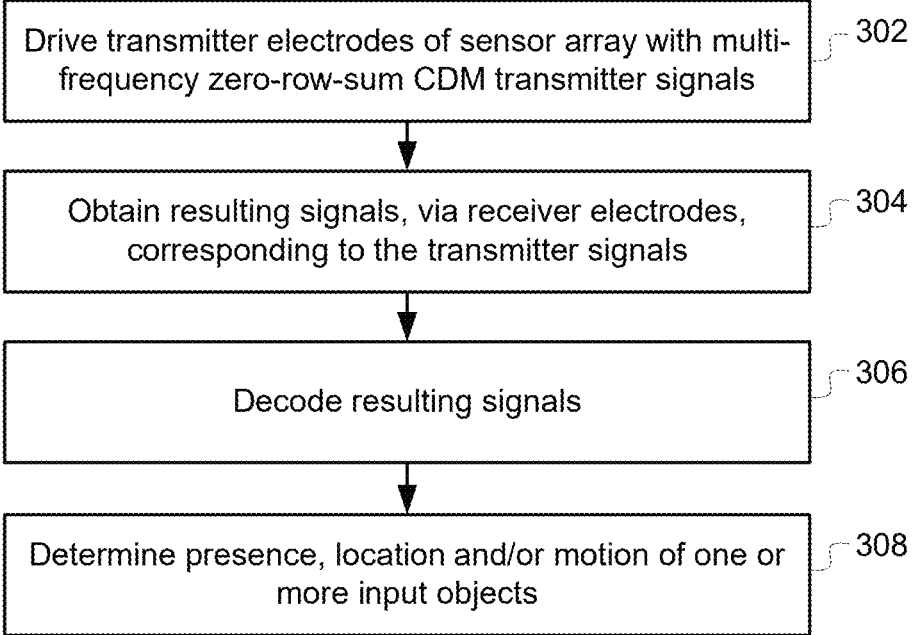
FIG. 3 depicts an example flowchart showing a process for performing multi-frequency zero-row-sum CDM touch sensing.

FIG. 3 depicts an example flowchart 300 showing a process for performing multi-frequency zero-row-sum CDM touch sensing. At stage 302, transmitter electrodes of a sensor array are driven with transmitter signals in a multi-frequency zero-row-sum CDM manner. For example, as discussed above with respect to FIG. 2B, the transmitter signals may correspond to two or more groups of transmitter electrodes being driven at two or more different frequencies, wherein each group is driven in accordance with a respective zero-row-sum CDM driving matrix. Further as discussed above with respect to FIG. 2B, the groups of transmitter electrodes may be driven simultaneously, sequentially, or according to a hybrid simultaneous/sequential approach.

At stage 304, resulting signals corresponding to the multi-frequency zero-row-sum CDM transmitter signals are obtained via receiver electrodes of the sensor array. Then, at stage 306, the resulting signals are decoded, and at stage 308, the presence, location, and/or motion of one or more input objects is determined from the decoded resulting signals. For example, stage 306 may include the operations depicted and discussed below in connection with FIGS. 4A-4B which result in a corrected "clean" 2D capacitive image, and the corrected clean image may be used to determine the presence, location, and/or motion of one or more input objects at stage 308.

Figure 4A:
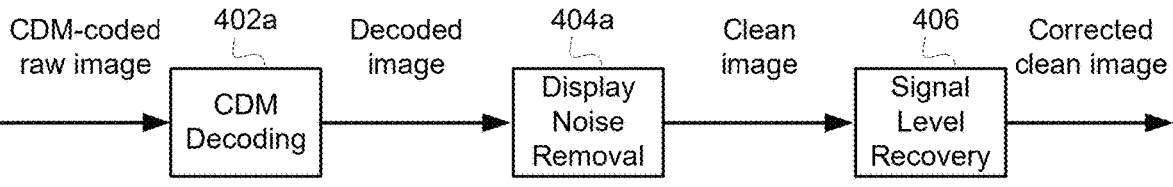
FIGS. 4A-4B depict example flowcharts showing example processes for decoding in accordance with a method for performing multi-frequency zero-row-sum CDM touch sensing.
Figure 4B:
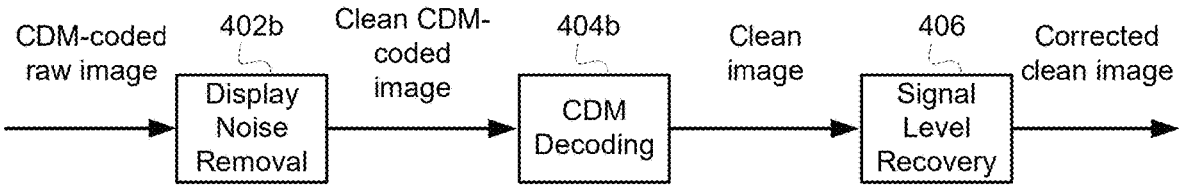

FIGS. 4A-4B depict example flowcharts 400*a*, 400*b* showing example processes for decoding in accordance with a method for performing multi-frequency zero-row-sum CDM touch sensing. As shown in FIG. 4A, resulting signals corresponding to a zero-row-sum-CDM-coded raw capacitive image are obtained by processing via receiver electrodes, and at stage 402*a*, CDM decoding is performed on the zero-row-sum-CDM-coded raw capacitive image. The CDM decoding at stage 402*a* may include applying a respective decoding matrix to the CDM driving matrix for each frequency, for example, according to the following formula:

$$D * A = I_m - \frac{1}{m} \text{Ones}$$

where D is the decoding matrix for a respective frequency, A is the zero-row-sum driving matrix for the respective frequency, m is the matrix order, Im is an m-by-m identity matrix, and "Ones" is an m-by-m matrix having all entries as 1s. The output of stage 402*a* is thus a decoded 2D capacitive image, wherein each row of the decoded capacitive image has a mean of "zero" along the transmitters.

At stage 404*a*, a display noise removal process (e.g., a primary display noise removal (PDNR) process, in which display noise is removed based on primary component analysis) is performed on the decoded capacitive image to remove display noise, and the output of stage 404*a* is a "clean" capacitive image ("clean" in the sense that display noise has been removed from the capacitive image) having a zero-mean for each row of the capacitive image.

It will be appreciated that the CDM decoding and display noise removal processes shown in FIG. 4A may be performed in any order. Thus, for example, as shown in FIG. 4B, the sequence of the two processes is switched, with display noise removal (PDNR) being performed at stage 402*b* on the zero-row-sum-CDM-coded raw capacitive image, followed by CDM decoding being performed at stage 404*b* on a clean CDM-coded capacitive image to obtain a clean capacitive image.

In both FIGS. 4A-4B, a signal level recovery process is performed at stage 406 on the clean capacitive image to obtain a corrected clean capacitive image. For example, for readings corresponding to each column (or part of the column) of a zero-row-sum CDM driving matrix, a signal level recovery value corresponding to a value less than the median value of a respective column is added to each reading in the column. To illustrate, with respect to a single respective receiver electrode, the readings for each entry in a column (or part of a column) may be defined as $x_0$, $x_1$, $x_2$, . . . , $x_{n-1}$, where n corresponds to the number of rows in the CDM driving matrix, and in the case of n=20 (corresponding to there being 20 transmitter electrodes), the eighth smallest reading among the 20 readings may be selected as the signal level recovery value. Thus, for example, in the case of there being 20 transmitter electrodes and 18 receiver electrodes, each of the 18 receiver electrodes obtains 20 readings (corresponding to the 20 sensing steps corresponding to the 20 rows of the CDM driving matrix), For zero-row-sum CDM, when a decoding matrix is used on the 20 readings for each receiver electrode, the result is 20 numbers having a mean of zero, and the signal level recovery process provides for adding a signal level recovery value that is smaller than or equal to the median value out of the 20 readings to each of the decoded results.

Using a value that is smaller than or equal to the median is generally advantageous for providing the best 2D capacitive image result. For example, in the case of 20 transmitter electrodes corresponding to 20 rows of a CDM driving matrix, one of the $6^{th}$ to $9^{th}$ smallest measurement values for a respective receiver electrode may be used as the signal level recovery value for that receiver electrode. In more general terms, in the case of there being n transmitter electrodes corresponding to n rows of a CDM driving matrix, the $x^{th}$ smallest reading from among the n readings for a respective receiver electrode may be selected as the signal level recovery value for that receiver electrode, where x is an integer less than n/2, or where x is an integer less than 90% of n/2 (i.e., x<0.45n), or where x is an integer less than 90% of n/2 and not less than 70% of n/2 (i.e., 35n<x<0.45n).

It will be appreciated that there may also be other ways of setting a signal level recovery value for each receiver electrode. For example, the signal level recovery value may be set to a value that is 10% less than the median value or in a range that is between 10% less than the median value and 30% less than the median value). For example, in the case of 20 receiver electrodes corresponding to 20 rows per column of a CDM driving matrix, the median value is determined as the average of the readings corresponding to the $10^{th}$ and $11^{th}$ rows. The signal level recovery value in this case may be set to 0.9 times that median value, or may be set to a value that falls between 0.7 times and 0.9 times that median value.

It will further be appreciated that embodiments of the present application are not limited to only setting the signal level recovery value to a value that is smaller than the median. For example, in other illustrative examples, the actual median (e.g., corresponding to the average of the tenth and the eleventh smallest readings in the case of n=20) may be used as the signal level recovery value.

The manner of selecting signal level recovery values for respective receiver electrodes may be predetermined. For example, an input device may be programmed to select a certain $x^{th}$ smallest reading out of n readings for each receiver electrode as the signal level recovery value, or may be programmed to determine the signal level recovery value for each receiver electrode based on a median value for each receiver electrode (e.g., using a calculation of a fraction of the median value for each receiver electrode).

It will be appreciated that the foregoing manner of determining a signal level recovery value yields a good estimate of the signal level even in certain edge cases, such as when half the transmitters of a sensor array are being covered by fingers.

It will further be appreciated that the signal level recovery process discussed above in connection with FIGS. 4A-4B is also usable in connection with single-frequency zero-row-sum CDM manners of performing touch sensing.

To test the effectiveness of the principles discussed herein, a prototype device was set up having a sensor array with 40 transmitter electrodes and 18 receiver electrodes, wherein the 40 transmitter electrodes were divided into two sub groups of 20 transmitter electrodes each corresponding to two different frequencies (e.g., 225 kHz and 250 kHz). Each group was thus driven with a respective zero-row-sum CDM matrix having 20 columns (CDM20). The two CDM20 driving matrices were derived from a Hadamard matrix, having an ideal signal-to-noise ratio (SNR) gain of sqrt (20)=4.47× or 13 dB. The result indicated a >40 dB SNR for the worst pixel with a noisy display image, which is relatively higher than for conventional touch sensing solutions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device, comprising:
  a plurality of sensor electrodes, including transmitter electrodes and receiver electrodes; and
  a processing system configured to:
    drive the transmitter electrodes using multiple frequencies and multiple zero-row-sum code-division-multiplexing (CDM) drive matrices, wherein respective subsets of the transmitter electrodes are driven with sensing signals at respective frequencies of the multiple frequencies, and wherein each of the zero-row-sum CDM drive matrices corresponds to a respective frequency of the multiple frequencies;
    obtain resulting signals via the receiver electrodes based on the transmitter electrodes being driven with the zero-row-sum CDM drive matrices;
    decode the resulting signals, wherein decoding the resulting signals includes performing a signal level recovery process; and determine presence, location and/or motion of one or more input objects based on the decoded resulting signals;

wherein each zero-row-sum CDM drive matrix has a/b rows, where a is the number of electrodes of the transmitter electrodes, and b is the number of frequencies of the multiple frequencies.

2. The input device according to claim 1, wherein the multiple frequencies include a first frequency corresponding to a first subset of transmitter electrodes and a second frequency corresponding to a second subset of transmitter electrodes, wherein the first subset of transmitter electrodes does not overlap with the second subset of transmitter electrodes, and wherein the processing system is configured to drive the first and second subsets of transmitter electrodes simultaneously.

3. The input device according to claim 1, wherein the multiple frequencies include a first frequency corresponding to a first subset of transmitter electrodes and a second frequency corresponding to a second subset of transmitter electrodes, wherein the first subset of transmitter electrodes overlaps with the second subset of transmitter electrodes, and wherein the processing system is configured to drive the first and second subsets of transmitter electrodes sequentially.

4. The input device according to claim 1, wherein performing the signal level recovery process comprises:

for each respective receiver electrode, adding a signal level recovery value to each of a plurality of readings corresponding to the respective receiver electrode.

5. The input device according to claim 4, wherein the signal level recovery value corresponds to a value less than a median value of a set of readings corresponding to the respective receiver electrode.

6. The input device according to claim 5, wherein the processing system is configured to set the signal level recovery value for a respective receiver electrode to an $x^{th}$ smallest reading from among n readings for the respective receiver electrode, where n corresponds to a number of rows of a respective zero-row-sum CDM driving matrix, and x is an integer less than n/2.

7. The input device according to claim 6, wherein x is less than 90% of n/2 and not less than 70% of n/2.

8. The input device according to claim 1, wherein decoding the resulting signals further includes:

performing a CDM decoding process; and performing a display noise removal process.

9. The input device according to claim 8, wherein the CDM decoding process is performed before the display noise removal process, and wherein both the CDM decoding process and the display noise removal process are performed prior to the signal level recovery process.

10. The input device according to claim 8, wherein the display noise removal process is performed before the CDM decoding process, and wherein both the CDM decoding process and the display noise removal process are performed prior to the signal level recovery process.

11. An input device, comprising:

a plurality of sensor electrodes, including transmitter electrodes and receiver electrodes; and a processing system configured to:

drive the transmitter electrodes using multiple frequencies and multiple zero-row-sum code-division-multiplexing (CDM) drive matrices, wherein respective subsets of the transmitter electrodes are driven with sensing signals at respective frequencies of the multiple frequencies, and wherein each of the zero-rowsum CDM drive matrices corresponds to a respective frequency of the multiple frequencies;

obtain resulting signals via the receiver electrodes based on the transmitter electrodes being driven with the zero-row-sum CDM drive matrices;

decode the resulting signals; and determine presence, location and/or motion of one or more input objects based on the decoded resulting signals;

wherein each zero-row-sum CDM drive matrix has a/b rows, where a is the number of electrodes of the transmitter electrodes, and b is the number of frequencies of the multiple frequencies.

12. The input device according to claim 11, wherein the multiple frequencies include a first frequency corresponding to a first subset of transmitter electrodes and a second frequency corresponding to a second subset of transmitter electrodes, wherein the first subset of transmitter electrodes does not overlap with the second subset of transmitter electrodes, and wherein the processing system is configured to drive the first and second subsets of transmitter electrodes simultaneously.

13. The input device according to claim 11, wherein the multiple frequencies include a first frequency corresponding to a first subset of transmitter electrodes and a second frequency corresponding to a second subset of transmitter electrodes, wherein the first subset of transmitter electrodes overlaps with the second subset of transmitter electrodes, and wherein the processing system is configured to drive the first and second subsets of transmitter electrodes sequentially.

14. The input device according to claim 11, wherein decoding the resulting signals further includes:

performing a CDM decoding process; and performing a display noise removal process.

15. An input device, comprising:

a plurality of sensor electrodes, including transmitter electrodes and receiver electrodes; and a processing system configured to:

drive the transmitter electrodes using a code-division-multiplexing (CDM) drive matrix;

obtain resulting signals via the receiver electrodes based on the transmitter electrodes being driven with the zero-row-sum CDM drive matrix;

decode the resulting signals, wherein decoding the resulting signals includes performing a signal level recovery process; and determine presence, location and/or motion of one or more input objects based on the decoded resulting signals;

wherein performing the signal level recovery process comprises: for each respective receiver electrode, adding a signal level recovery value to each of a plurality of readings corresponding to the respective receiver electrode; and wherein the signal level recovery value corresponds to a value less than a median value of a set of readings corresponding to the respective receiver electrode.

16. The input device according to claim 15, wherein the processing system is configured to set the signal level recovery value for a respective receiver electrode to an $x^{th}$ smallest reading from among n readings for the respective receiver electrode, where n corresponds to a number of rows of a respective zero-row-sum CDM driving matrix, and x is an integer less than n/2.

17. The input device according to claim 16, wherein x is less than 90% of n/2 and not less than 70% of n/2.

18. The input device according to claim 15, wherein decoding the resulting signals further includes:

performing a CDM decoding process; and performing a display noise removal process.

19. The input device according to claim 18, wherein the CDM decoding process is performed before the display noise removal process, and wherein both the CDM decoding process and the display noise removal process are performed prior to the signal level recovery process.

20. The input device according to claim 18, wherein the display noise removal process is performed before the CDM decoding process, and wherein both the CDM decoding process and the display noise removal process are performed prior to the signal level recovery process.

* * * * *